United States Patent
Jain

(10) Patent No.: US 9,973,528 B2
(45) Date of Patent: May 15, 2018

(54) TWO-STAGE HASH BASED LOGIC FOR APPLICATION LAYER DISTRIBUTED DENIAL OF SERVICE (DDOS) ATTACK ATTRIBUTION

(71) Applicant: Fortinet, Inc., Sunnyvale, CA (US)

(72) Inventor: Hemant Kumar Jain, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 182 days.

(21) Appl. No.: 14/976,938

(22) Filed: Dec. 21, 2015

(65) Prior Publication Data

US 2017/0180415 A1    Jun. 22, 2017

(51) Int. Cl.
*H04L 29/06* (2006.01)

(52) U.S. Cl.
CPC ...... *H04L 63/1458* (2013.01); *H04L 63/1416* (2013.01)

(58) Field of Classification Search
CPC .......... H04L 63/1458; H04L 63/1416
USPC ........................................... 726/23
See application file for complete search history.

(56) References Cited

U.S. PATENT DOCUMENTS

| | | |
|---|---|---|
| 5,805,801 A | 9/1998 | Holloway et al. |
| 5,919,257 A | 7/1999 | Trostle |
| 5,931,946 A | 8/1999 | Terada et al. |
| 5,991,881 A | 11/1999 | Conklin et al. |
| 6,016,546 A | 1/2000 | Kephart et al. |
| 6,088,804 A | 7/2000 | Hill et al. |
| 6,115,680 A | 9/2000 | Coffee et al. |
| 6,279,113 B1 | 8/2001 | Vaidya |
| 6,301,668 B1 | 10/2001 | Gleichauf et al. |
| 6,321,338 B1 | 11/2001 | Parras et al. |
| 6,408,297 B1 | 6/2002 | Ohashi |
| 6,711,127 B1 | 3/2004 | Garman et al. |
| 6,904,057 B2 | 6/2005 | Sarkinen et al. |
| 6,928,549 B2 | 8/2005 | Brock et al. |
| 6,934,850 B2 | 8/2005 | Sato |
| 6,944,168 B2 | 9/2005 | Paatela et al. |
| 6,944,678 B2 | 9/2005 | Lu et al. |
| 7,006,505 B1 | 2/2006 | Bleszynski et al. |
| 7,058,974 B1 | 6/2006 | Maher et al. |

(Continued)

FOREIGN PATENT DOCUMENTS

| | | |
|---|---|---|
| EP | 0493892 | 7/1992 |
| WO | 0078004 | 12/2000 |

OTHER PUBLICATIONS

Connie Howard, "Security consideration at the data link layer: layer 2 the weakest link," Packet Magazine, fist Quarter 2003, pp. 30-33.

(Continued)

*Primary Examiner* — Hadi S Armouche
*Assistant Examiner* — Sakinah White Taylor
(74) *Attorney, Agent, or Firm* — Hamilton, DeSanctis & Cha LLP

(57) ABSTRACT

Methods and systems for a two-stage attribution of application layer DDoS attack are provided. In a first table just a hash index is maintained whereas the second stage table keeps the string parameter corresponding to the application layer attribute under attack. A linked list maintains a plurality of rows if there is hash collision in the first table. The second table is aged out and reported periodically with details of large strings.

18 Claims, 5 Drawing Sheets

(56) References Cited

U.S. PATENT DOCUMENTS

| | | |
|---|---|---|
| 7,082,117 B2 | 7/2006 | Billhartz |
| 7,150,044 B2 | 12/2006 | Hoefelmeyer et al. |
| 7,177,930 B1 | 2/2007 | LoPresti |
| 7,233,597 B2 | 6/2007 | Kumar et al. |
| 7,234,168 B2 | 6/2007 | Gupta et al. |
| 7,305,708 B2 | 12/2007 | Norton et al. |
| 7,308,715 B2 | 12/2007 | Gupta et al. |
| 7,386,733 B2 | 6/2008 | Yoon et al. |
| 7,409,714 B2 | 8/2008 | Gupta et al. |
| 7,411,957 B2 | 8/2008 | Stacy et al. |
| 7,424,744 B1 | 9/2008 | Wu et al. |
| 7,426,634 B2 | 9/2008 | Jain |
| 7,602,731 B2 | 10/2009 | Jain |
| 7,626,940 B2 | 12/2009 | Jain |
| 2002/0032871 A1 | 3/2002 | Malan et al. |
| 2002/0035698 A1 | 3/2002 | Malan et al. |
| 2002/0083175 A1 | 6/2002 | Afek et al. |
| 2002/0101819 A1 | 8/2002 | Goldstone |
| 2002/0144156 A1 | 10/2002 | Copeland, III |
| 2002/0194469 A1 | 12/2002 | Dominique et al. |
| 2003/0004688 A1 | 1/2003 | Gupta et al. |
| 2003/0004689 A1 | 1/2003 | Gupta et al. |
| 2003/0009699 A1 | 1/2003 | Gupta et al. |
| 2003/0014662 A1 | 1/2003 | Gupta et al. |
| 2003/0041266 A1 | 2/2003 | Ke et al. |
| 2003/0065943 A1 | 4/2003 | Geis et al. |
| 2003/0097557 A1 | 5/2003 | Tarquini et al. |
| 2003/0105881 A1 | 6/2003 | Symons et al. |
| 2003/0123447 A1 | 7/2003 | Smith |
| 2003/0123452 A1 | 7/2003 | Cox et al. |
| 2003/0145232 A1* | 7/2003 | Poletto ............... H04L 63/1408 726/22 |
| 2003/0149887 A1 | 8/2003 | Yadav |
| 2003/0204632 A1 | 10/2003 | Willebeek-LeMair et al. |
| 2003/0221013 A1 | 11/2003 | Lockwood et al. |
| 2004/0008681 A1 | 1/2004 | Govindarajan et al. |
| 2004/0114519 A1 | 6/2004 | MacIsaac |
| 2004/0215976 A1 | 10/2004 | Jain |
| 2005/0044406 A1 | 2/2005 | Stute |
| 2005/0060557 A1 | 3/2005 | Lin |
| 2005/0086500 A1 | 4/2005 | Albornoz |
| 2005/0111460 A1 | 5/2005 | Sahita |
| 2006/0020796 A1* | 1/2006 | Aura ..................... H04L 9/3236 713/168 |
| 2006/0023709 A1 | 2/2006 | Hall et al. |
| 2006/0117386 A1 | 6/2006 | Gupta et al. |
| 2006/0133377 A1 | 6/2006 | Jain |
| 2006/0146816 A1 | 7/2006 | Jain |
| 2008/0028467 A1* | 1/2008 | Kommareddy ..... H04L 63/1458 726/23 |
| 2008/0120721 A1* | 5/2008 | Moon ..................... H04L 69/22 726/23 |
| 2011/0302648 A1* | 12/2011 | Yoo ..................... G06F 21/554 726/13 |
| 2014/0205090 A1* | 7/2014 | Li ........................ H04L 9/3066 380/44 |
| 2015/0319182 A1* | 11/2015 | Natarajan ............... G06F 21/53 726/24 |

OTHER PUBLICATIONS

Rocky K. C. Chang, "Defending against flooding-based distributed denial-of-service attacks: a tutorial," IEEE Communications Magazine, Oct. 2002, pp. 42-51.

David Moore et al., "Inferring internet denial-of-service activity," Proc. 10.sup.th USENIX Sec. Symp. 2001.

Rik Farrow, "VLANs: virtually insecure?" Network Magazine, Mar. 2003.

"NetScreen concepts and examples: screen OS reference guide, vol. 2: fundamentals P/N 09-0520-000 Rev F", pp. 34-44. Retrieved on Sep. 7, 2002. Retrieved from the internet: < URL: http://www.netscreen.com/support/downloads/CE-v2.pdf>.

Jeff Forristal, "Fireproofing against DoS attacks," Network Computing, Dec. 10, 2001. pp. 65-74.

Robert Beverly, "MS-SQL slammer/sapphire traffic analysis." Retrieved on Mar. 31, 2003. Retrieved from the internet: < URL: http://mmo.lcs.mit.edu/slammer/>.

Jake D. Brutlag, "Aberrant behavior detection in time series for network monitoring," presented at 2000 LISA XIV, Dec. 3-8, 2000, New Orleans, LA. <Retrieved from the internet: < URL: www.usenix.org/events/lisa2000/full.sub.--papers/brutlag/brutlag.sub.--ht- ml/>.

Stephen R. Lawrence, "Demand forecasting, time series models." Retrieved on Sep. 8, 2003. Retrieved from the internet: < URL: http://www.-bus.colorado.edu/faculty/lawrence/tools/FORECAST/forecast.ppt- >.

A multi-agent based system for intrusion detection; Hegazy, I.M.; Al-Arif, T.; Fayed, Z.T.; Faheem, H.M.; Potentials, IEEE vol. 22, Issue 4, Oct.-Nov. 2003 pp. 28-31.

Architecture for a hardware-based, TCP/IP content-processing system; Schuehler, D.V.; Moscola, J.; Lockwood, J.W.; Micro, IEEE vol. 24, Issue 1, Jan.-Feb. 2004 pp. 62-69.

TCP-Stream reassembly and state tracking in hardware; Necker, M.; Contis, D.; Schimmel, D.; Field-Programmable Custom Computing Machines, 2002. Proceedings. 10th Annual IEEE Symposium on Apr. 22-24, 2002 pp. 286-287.

Architecture for a hardware based, TCP/IP content scanning system [intrusion detection system applications]; Schuehler, D.V.; Moscola, J.; Lockwood, J.; High Performance Interconnects, 2003. Proceedings. 11th Symposium on Aug. 20-22, 2003 pp. 89-94.

http://www.idt.com/docs/75K6213452134.sub.--DS.sub.--80635.pdf 4.5M and 9M Network Search Engine (NSE) with QDR.TM. Interface.

G. Iannaccone, S. Jaiswal and C. Diot, "Packet Reordering Inside the Sprint Backbone," Tech. Report, TR01-ATL-062917, Sprint ATL, Jun. 2001.

E. Blanton and M. Allman, "On Making TCP More Robust to Packet Reordering", ACM Computer Comm. Review, 32 (1), Jan. 2002, pp. 20-30.

M. Laor and L. Gendel, "The Effect of Packet Recordering in a Backbone Link on Application Throughput," IEEE Network, Sep./Oct. 2002, pp. 28-36.

Girish P. Chandranmenon et al., "Reconsidering Fragmentation and Reassembly," Aug. 1, 1997, Washington University in St. Louis, pp. 1-23.

T. Banka, A. A. Bare and A. P. Jayasumana, "Metrics for Degree of Reordering in Packet Sequences," Proc. 27th IEEE Conference on Local Computer Networks, Nov. 2002, pp. 333-342.

J. Bellardo and S. Savage, "Measuring Packet Reordering," Proc. IMW'02, Nov. 2002, pp. 97-105.

S. Jaiswal, G. Iannaccone, C. Diot, J. Kurose and D. Towsley, "Measurement and Classification of Out-of-sequence Packets in Tier-1 IP Backbone," Proc. IEEE INFOCOM, Mar. 2003, pp. 1199-1209.

Chris Clark, Wenke Lee, David Schimmel, Didier Contis, Mohamed Kone and Ashley Thomas, "A Hardware Platform for Network Intrusion Detection and Prevention", Workshop on Network Processors & Applications—NP3, Feb. 14-15, 2004, Madrid, Spain.

Colleen Shannon, David Moore, k claffy, "Characteristics of Fragmented IP Traffic on Internet Links", PAM2001—A workshop on Passive and Active Measurements, RIPE NCC, (Amsterdam, Netherlands), 2001.

Thomas H. Ptacek; Timothy N. Newsham, "Insertion Evasion and Denial of Service Eluding Network Intrusion Detection", Secure Networks, Jan. 1998.

David V. Schuehler John Lockwood, "TCP-Splitter A TCPIP Flow Monitor in Reconfigurable Hardware", IEEE Micro, Jan./Feb. 2003.

Marc Necker, Didier Contis, David Schimmel, "TCP-Stream Reassembly and State Tracking in Hardware", Proceedings of the 10th Annual IEEE Symposium on Field-Programmable Custom Computing Machines (FCCM'02).

David V. Schuehler, James Moscola, John Lockwood, "Architecture for a Hardware Based, TCP/IP Content Scanning System", Proceedings of Hot Interconnects 11 (Hotl-11), Stanford, CA, Aug. 20-22, 2003, pp. 89-94.

(56) References Cited

OTHER PUBLICATIONS

J. Postel, J. Reynolds, "Telnet Protocol Specifications", RFC 854, May 1983.
J. Postel, J. Reynolds, "File Transfer Protocol (FTP)", RFC 959, May 1985.
Mockapetris, "Domain Names—Implementation and Specification", RFC 1035, Nov. 1987.
Sun Microsystems, "RPC: Remote Procedure Call Protocol Specification Version 2", RFC 1057, Jun. 1988.
J. Myers, M. Rose, "Post Office Protocol—Version 3", RFC 1939, May 1996.
R. Fielding, et. al, "Hypertext Transfer Protocol—HTTP/1.1", RFC 2616, Jun. 1999.
J. Klensin, "Simple Mail Transfer Protocol", RFC 2821, Apr. 2001.
David D. Clark, "IP Datagram Reassembly Algorithms", RFC 815, Jul. 1982.
http://www.ccsi.cs.sunysb.edu/elibrary/linux/network/iprecv4.pdf
Internet pages, "IP Reassembly", downloaded on Oct. 19, 2004.
Adam Dunkels, "Minimal TCP/IP implementation with proxy support", SICS Tchnical Report T2001:20, ISSN 1100-3154.
David Watson, Matthew Smart, G. Robert Malan, "Protocol Scrubbing: Network Security Through Transparent Flow Modification", IEEE/ACM Transactions on Networking, vol. 12, No. 2, Apr. 2004.
Matthew V. Mahoney et al., "PHAD: Packet Header Anomaly Detection for Identifying Hostile Network Traffic," Florida Institute of Technology Technical Report CS-2001-04, pp. 1-17.
Sun Microsystems, Inc., "RPC: Remote Procedure Call" RFC 1050, Apr. 1988.
http://www.syngress.com/book.sub.-catalog/244.sub.-snort/sample.pdf, "Preprocessors", Internet pages downloaded on Oct. 19, 2004.
Network-based Intrusion Detection Model for Detecting TCP SYN flooding; U Kanlayasiri, S Sanguanpong—Proceedings of the 4 th National Computer Science 2000.
Some approaches to information security of communication networks; S Avdoshin, V Serdiouk—Informatica-Ljubljana- , 2002.
Chung, E., "Network Management & Security." 2003.

\* cited by examiner

TWO-STAGE HASH BASED LOGIC FOR APPLICATION LAYER DISTRIBUTED DENIAL OF SERVICE (DDOS) ATTACK ATTRIBUTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

CROSS-REFERENCE TO RELATED PATENTS

This application may relate to the subject matter of U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", and U.S. Pat. No. 7,626,940 entitled "System and method for integrated header, state, rate and content anomaly prevention for domain name service" all of which are hereby incorporated by reference in their entirety for all purposes.

FIELD

Embodiments of the present invention relate generally to network and computer security. In particular embodiments of the present invention relate to methods for the prevention of distributed denial of service (DDoS) attacks on Internet infrastructure.

DESCRIPTION OF THE BACKGROUND ART

DDoS attacks vary. The parameters for DDoS attacks vary. However, in a DDoS attack, the important part, from the viewpoint of a network administrator, and therefore a mitigation appliance, is to find what's common among the barrage of packets that are reaching the destination network. This is being referred to as attribution of the attack. Network and transport layer DDoS attacks can be attributed easily. An example of network layer DDoS attacks is one on Internet Protocol Secure (IPSec) protocol, where all attack packets, though coming from multiple IP addresses, have the same IP Protocol number, namely 50, corresponding to IPSec. Protocol 50 identifies the type of protocol used to attack and can be rate-limited while everything else flows unaltered. An example of a transport layer DDoS attack is an attack on User Datagram Protocol (UDP) port 3000. In this case, the common attribute for all attack packets is UDP port 3000. Such numbered attributes are easy to identify and report and do not heavily increase the memory table capacity while monitoring because numbers take a limited number of bytes to store.

Application layer Distributed DoS (DDoS) attacks are becoming commonplace. DDoS attack mitigation of application layer attacks requires ability to identify the attacks more specifically. An example of application layer attacks is one on the Hypertext Transfer Protocol (HTTP) protocol, where all attack packets, though coming from multiple IP addresses, have the same user-agent. The user-agent identifies the type of browser or script used to access the page under attack. The strings which identify user-agents vary in sizes. These could vary from a few bytes to few hundred of bytes. An example of Apple iPhone's user agent for a specific version is "Mozilla/5.0 (iPhone; CPU iPhone OS 5_0 like Mac OS X) AppleWebKit/534.46 (KHTML, like Gecko) Version/5.1 Mobile/9A334 Safari/7534.48.3". As yet another example, Firefox browser version 42.0 on Windows 10, has a user-agent, "Mozilla/5.0 (Windows NT 10.0; WOW64; rv:42.0) Gecko/20100101 Firefox/42.0". In a similar way, other attributes which identify a specific attack include host, referrer, cookie, Uniform Resource Locator (URL), etc. Most of these are variable length strings and may sometimes be very large in length. An exemplary URL on the Amazon.com website for Star Wars blu-ray is "/Star-Trilogy-Episodes-IV-VI-Blu-ray/dp/B00E9PMMX0/ref=sr_1_1". Sometimes further strings are added to this URL to identify further details of the users who are accessing them or the search query that led to the access of the URL.

In application layer DDoS attacks, a security administrator would like an appliance to attribute these attacks to a specific user-agent, host, referrer, URL etc. Current methods of DDoS attack reporting do not have the speed and processing power to instantly and correctly identify these variable length strings, especially if they don't fit in a few bytes. For example, if an attack script has been written only for a specific device, all attack packets will have the same user-agent. If the same script has been distributed by a hacker to a network to create a botnet, they may all have the same user-agent even though coming from different IP addresses. Therefore during mitigation, it makes sense to simply block packets coming with that specific user-agent and leave all other traffic unaffected. The same can be done for attacks written for a specific URL, specific Host, with specific Referrer etc. Clearly, a new method is needed to attribute DDoS attacks to large variable size common parameter strings in real-time under high volume application layer DDoS attacks. The purpose of such attribution is to facilitate dropping of all subsequently received packets with common parameters to avoid false positives and/or to track sources that send such packets and block those source IP addresses.

SUMMARY

Methods and systems are described for a two-stage solution to the attribution of DDoS attacks specifically at the application layer. According to one embodiment, a method of grouping a series of DDoS attacks based on a hash of the monitored string is provided. These strings correspond to application layer items such as URL, host, cookie, user-agent, referrer etc. The size of the hash index is limited—typically under 32 bits. The second stage then refines the attribution by becoming more specific to only attacked parameters. The scheme works because a large number of hash indexes need to be monitored but only a limited number of hash indexes are under attack at a given time. The attack status for each of the monitored hashes is determined by comparing, by the DDoS detection module, granular traffic rates directed to the monitored hashes to corresponding adaptive thresholds. When a granular traffic rate for a particular monitored hash is determined to exceed its corresponding adaptive threshold, a host computer is notified by the DDoS detection module of the attack status for the particular monitored hash.

Other features of embodiments of the present disclosure will be apparent from accompanying drawings and from detailed description that follows.

DETAILED DESCRIPTION

Figure 1:
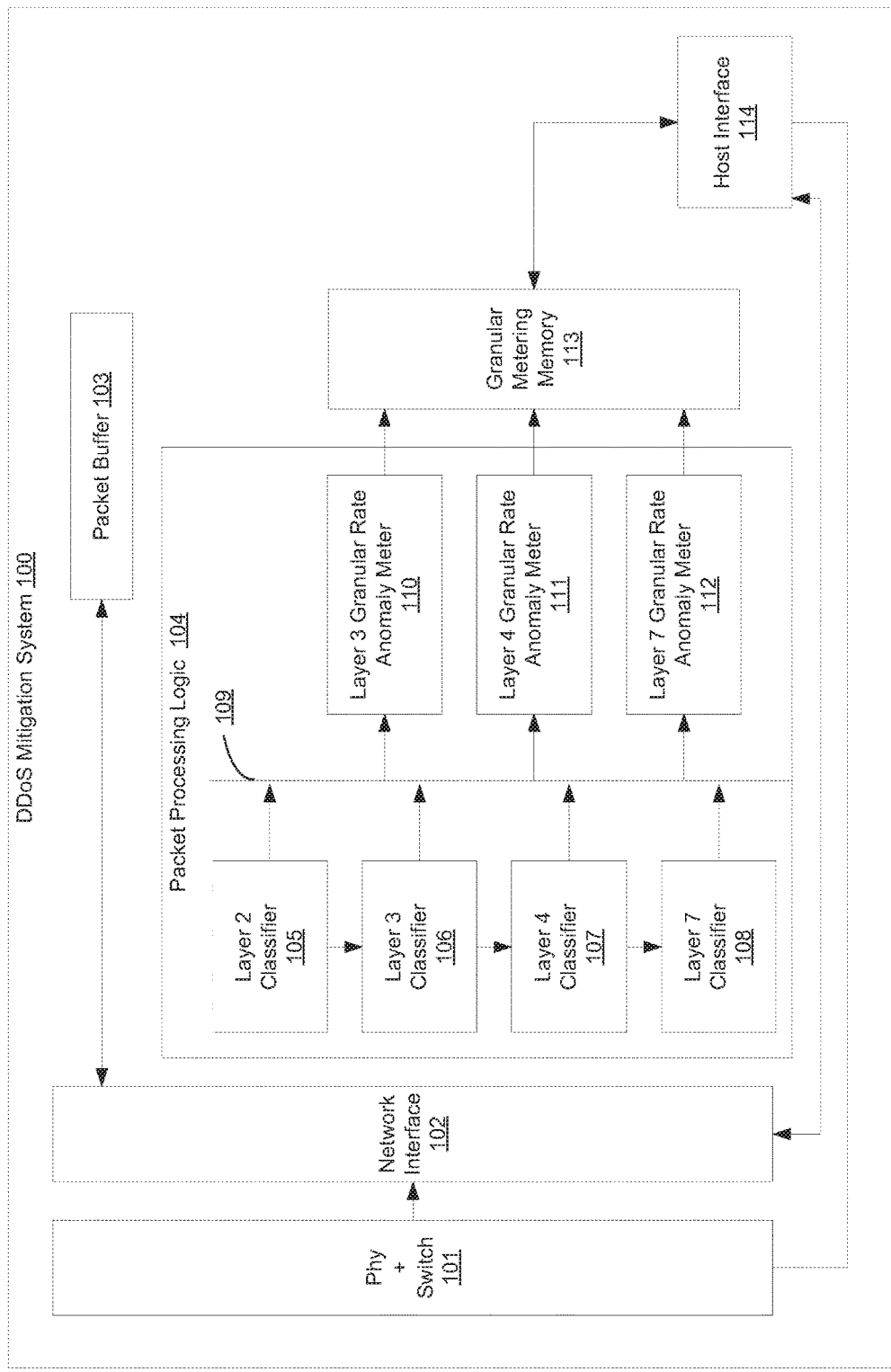
FIG. 1 is a block diagram conceptually illustrating a DDoS mitigation system according to an embodiment of the present invention.

Methods and systems are described for attribution of application layer DDoS attacks. According to one embodiment, a DDoS attack mitigation module comprises an apparatus that allows granular thresholds to be set for multiple layer 3, 4 or 7 parameters. Once a traffic threshold is breached, the specific parameter is rate limited or identified for a specific treatment. The parameter may be a simple number such as a protocol, port in which case attribution is direct—i.e. no further details are required. Complexity arises when the parameter is a variable length and possibly a long length string. In one embodiment, a hash based indexing scheme is used to convert the strings to hash index and store the threshold, rates and drop counts. Since the depth of the table can be very large—e.g., 1 M entries, any increase in the width of the table is expensive in terms of memory storage, access and retrieval. For example, if the maximum expected length of a parameter (e.g., a URL) is 1024 characters, then the width of the table has to be increased to accommodate such width. Thus if the hash table depth is 1 M entries, an additional 1 Gbytes of memory would be needed for such strings. Such a choice is wasteful because not all URLs are under attack at a given time.

In a simplistic solution, the designer can either show first 16 bytes, last 16 bytes or some 16 bytes of the long string. This is sub-optimal and not very useful. Thus if the hash table depth is 1 M entries, an additional 16 Mbytes of memory is needed for incomplete strings.

The logic described herein provides a way to store a large set of strings but not for every entry in the hash table. This is achieved using a two-stage implementation wherein a secondary table is used for only entries that have a non-zero drop count—i.e., parameters under attack.

According to one embodiment, the purpose of the attribution logic is to determine the instantaneous application layer parameter under attack. It does this via storing the granular packet rates in a granular metering memory. Rate anomaly meters inside the packet processing logic receive classifier output and maintain the instantaneous packet-rates and compare them against the thresholds set adaptively and continuously by the controlling host.

An object of various embodiments of the present invention is to provide a high-rate method suitable for hardware logic of attributing attacks to an application layer parameter.

FIG. 1 is a block diagram of a DDoS mitigation system 100 in accordance with an embodiment of the present invention. DDoS mitigation system 100 includes a packet interface 102, a packet buffer 103, a packet processing logic 104, a granular metering memory 113 and a host interface 114.

When packets are received, packet interface 102 buffers them in a packet buffer 103 and serially releases them to the subsequent logic.

When packet processing logic 104 receives traffic flow packets from packet interface 105, packet processing logic 104 uses a granular metering memory 113 to calculate and derive granular packet rates and to determine if there are any threshold violations. In one embodiment, granular metering memory 113 may be partially inside a Field-Programmable Gate Array (FPGA)/Application-Specific Integrated Circuit (ASIC) based board and large blocks of memory may be external, for example, in a Double Data Rate (DDR) memory or Quad Data Rate (QDR) Memory. According to one embodiment, a host computer can read the granular packet rate parameters via host interface 114. Those skilled in the art will appreciate a variety of alternative interfaces may be used. Host computer can similarly set the granular packet rate thresholds based on past behavior for that granular rate parameter.

Layer 2 classifier 105 receives frames and classifies packets based on their layer 2 characteristics and ensures that it is a supported layer 2 packet (e.g., an Ethernet 802.3 frame). Layer 2 classifier 105 also parses the layer 2 headers and passes that information to subsequent logic blocks over a classification bus 109. In an exemplary embodiment of this invention, layer 2 classifier 105 block can parse Ethernet frames and IEEE 802.2/3 frames and can determine Address Resolution Protocol (ARP), Reverse ARP (RARP), broadcast, Internet Protocol (IP), multicast, non-IP, virtual local are network (VLAN) tagged frames, and double encapsulated VLAN tagged frames.

Layer 3 classifier 106 receives packet data as well as layer 2 classifier information from layer 2 classifier 105. Layer 3 classifier 106 extracts the layer 3 header information in IP version 4 (IPv4) and IP version 6 (IPv6) headers and passes it on to the subsequent logic over classification bus 109. In some embodiments, layer 3 classifier 106 parses IPv4 and IPv6 packets and determines properties, including, but not limited to, type of service (TOS), IP Options, fragmentation, and protocol.

Layer 4 classifier 107, similarly, parses the layer 4 information from packets that are guaranteed to be in order with respect to fragmentation. In an exemplary embodiment, this classifier looks at Transmission Control Protocol (TCP), User Datagram Protocol (UDP), Internet Control Message Protocol (ICMP), IPSec—Encapsulating Security Payload (ESP), and IPSec—Authentication Header (AH). This information is passed to the subsequent blocks over classification bus 109. In an exemplary embodiment of this invention, this classifier can parse layer 4 information, including, but not limited to, TCP Options, TCP ports, UDP Ports, ICMP types/codes, TCP flags, sequence numbers, ACK numbers and the like. Packets that are anomalous may be dropped.

Layer 7 classifier 108, similarly, parses the layer 7 information from packets. In an exemplary embodiment, this classifier looks at TCP, UDP packets and parses layer 7 traffic flow statistics from protocols, including, but not limited to, NetFlow, sFlow, jFlow and CFlow. This information is passed to the subsequent blocks over classification bus 109.

Layer 3 rate anomaly meter 110 utilizes the output of layer 3 classifier 106 and derives layer 3 granular rates for identified destinations and enforces layer 3 granular rate thresholds based thereon.

Layer 4 rate anomaly meter 111 utilizes the output of layer 4 classifier 107 and derives layer 4 granular rates for identified destinations and enforces layer 4 granular rate thresholds based thereon. The process of enforcing layer 4 granular rate will be described further below with reference to Table 1.

Layer 7 rate anomaly meter 112 utilizes the output of layer 7 classifier logic 108 and derives layer 7 granular rates for identified destinations and enforces layer 7 granular rate thresholds based thereon. In embodiments of the present invention, layer 7 rate anomaly meter 112 is a two-stage layer 7 rate anomaly meter as described in further detail below with reference to FIGS. 2 and 3.

Layer 4 rate anomaly meter 111 may use a table, such as Table 1, to track the rate of each port that is monitored by the meter 111.

TABLE 1

| TCP Port | Threshold - Packets/second | Current Rate - Packets/second | Drop count this period |
|---|---|---|---|
| 0 | | | |
| 3000 | 1000 | 1200 | 20000 |
| 4000 | 500 | 300 | 0 |
| . | | | |
| . | | | |
| . | | | |

Table 1 depicts an exemplary table for tracking the layer 4 drops for monitoring TCP port floods. In this exemplary table, the depth of the table is 65536 (corresponding to known TCP ports). Each row has an index (which may be implicit), a threshold in terms of packets per second, current rate in terms of packets per second and drop count in a period under observation. In this exemplary situation, when a port such as port 3000 has a high packet rate above the set threshold, the mitigation logic can start dropping the packets and counting them. These drops can be very easily attributed to port 3000 as it is an implicit index of the row. The name and number of columns are only for explaining the concepts. In a practical implementation, there may be more columns and corresponding data.

Figure 2:
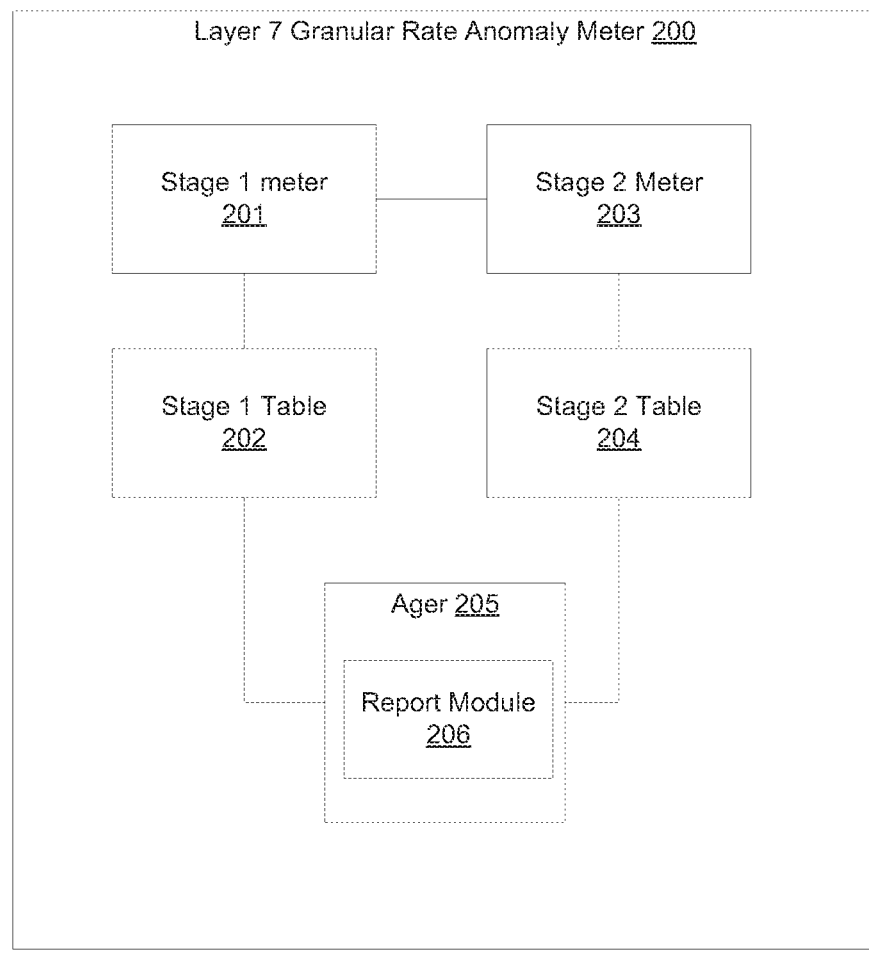
FIG. 2 is a block diagram conceptually illustrating a layer 7 granular rate anomaly meter according to an embodiment of the present invention.

FIG. 2 is a block diagram conceptually illustrating a two-stage layer 7 granular rate anomaly meter 200 according to an embodiment of the present invention. Layer 7 granular rate anomaly meter 200 can be used as layer 7 meter 112 of FIG. 1. In the present example, layer 7 granular rate anomaly meter 200 include a stage 1 meter 201, a stage 1 table 202, a stage 2 meter 203, a stage 2 table 204 and an ager logic 205.

Stage 1 meter 201 is used for tracking rates of accesses to HTTP URLs that are hosted by a server protected by a DDoS mitigation system. The number of URLs that are monitored by meter 200 can be very large, e.g., over one million URLs. Meanwhile, a URL can be a long string, e.g., 1K bytes. Therefore, it would be very expensive in term of memory usage, access and retrieval if the full URLs were to be kept in a table within the memory of meter 200. For example, if the maximum expected length of a layer 7 attribute (e.g., a URL) is 1024 characters, then the width of the table would have to be increased to accommodate such width. Such a choice is wasteful because not all URLs are under attack at a given time. Thus if the stage 1 table's depth is 1 M entries, an additional 1 Gbytes of memory would be needed for such full URLs. Therefore, in accordance with embodiments of the present invention, a digest of the URLs, e.g., first hash values, are maintained in the stage 1 table instead of the full URLs. The first hash values are calculated based on a first hash algorithm and have a limited length, e.g., 20 bits. Stage 1 meter 201 tracks traffic rates of the first hash values and determines if a URL is under attack by comparing the traffic rates with corresponding thresholds. Table 2 shows an example of stage 1 table 202 that is used by stage 1 meter 201.

TABLE 2

| Used Flag | URL Hash Index | Threshold Packets/s | Current Rate Packets/s | Drop count | URLs Drop count | URLs (for explanation only) |
|---|---|---|---|---|---|---|
| 0 | 0 | | | | | |
| 1 | 1000 | 10000 | 100 | 0 | | /safe.html /noproblems.html |
| . | | | | | | |
| . | | | | | | |
| . | | | | | | |
| 1 | 1022 | 1000 | 1200 | 20000 | 3 | /underattack.html /victim.html |
| . | | | | | | |
| . | | | | | | |
| . | | | | | | |
| 1 | 1054 | 2000 | 4000 | 300000 | 5 | /attacked.html /flooded.html |
| 1 | 1055 | 500 | 300 | 0 | | /index.php /lowrate.html |
| . | | | | | | |
| . | | | | | | |
| . | | | | | | |

Table 2 depicts an exemplary stage 1 table for tracking the application layer attacks on HTTP URLs according to an embodiment of the present invention. Unlike a port, a URL is a variable size string and to monitor it, a first hash is used. The first hash is generated from the string and used as an index. Each row of the table is then implicitly indexed by the hash index. The hash index can vary from 0 to $2^n-1$ where n is the number of bits in the first hash. According to one embodiment, each row has columns including but not limited to an index (which may be implicit), a threshold in terms of packets per second, current rate in terms of packets per second and drop count in a period under observation. In an exemplary situation, a protected entity has many URLs which can be accessed from the Internet. These include /safe.html, /noproblems.html, /underattack.html, /victim.html, /attacked.html, /flooded.html, /index.php, and lowrate.html. As can be seen in Table 2, some of these are exceeding the set threshold (under attack) and some are below threshold (not under attack). In this example, both the first hash values of URLs of /safe.html and /noproblems.html are 1000 due to the length limit of the first hash value. Both the first hash values of URLs of /underattack.html and /victim.html are 1022. Both the first hash values of URLs of /attacked.html and /flooded.html are 1054. Both the first hash values of URLs of /index.php, and /lowrate.html are 1055. For explanation purpose, a "URL" column is added to Table 2 to show the corresponding of first values and URLs. In one embodiment of the present invention, one URL is stored at stage 1 table.

One goal of embodiments of the present invention is to be able to identify and report the actual strings (e.g., /underattack.html, /flooded.html etc). In most cases, such strings may be large length—say 1K bytes or more.

According to an embodiment of this invention, application layer attributes can be converted to a hash using algorithms including but not limited to the MD5 message-digest algorithm, a Secure Hash Algorithm (e.g., SHA-0, SHA-1, SHA-2 and Cyclic Redundancy Check (CRC) (e.g., CRC32). The depth of this table depends on the number of bits in the hash. For example, if the hash has 20 bits, the table can have 1 M entries. In an exemplary embodiment, the table is implemented without linked lists—thus if there is a hash collision due to two strings hashing to the same location in the table, the two strings may be treated the same for the purpose of rates. Since the thresholds are learned based on the same scheme, the behavior remains correct and thresholds cover multiple strings colliding in the same location. According to an embodiment, the two strings are attributed separately in the second stage if there is an attack on the same hash index.

In one embodiment, when there are non-zero drops due to the traffic for a hash-index crossing the thresholds, stage 2 meter 203 may be used to detect the exact URL that is under attack by tracking the attack in a stage 2 table as depicted in Table 3.

TABLE 3

| Index (Implicit) | Used Flag | URL Hash1 | URL Hash2 | URL | Drop count | Link |
|---|---|---|---|---|---|---|
| 0 | 0 | | | | | |
| 1 | 0 | | | | | |
| 2 | 0 | | | | | |
| 3 | 1 | 1022 | 0x1234 | /underattack.html | 15000 | 4 |
| 4 | 1 | 1022 | 0x4321 | /victim.html | 5000 | 0 |
| 5 | 1 | 1054 | 0x3456 | /flooded.html | 2000000 | 6 |
| 6 | 1 | 1054 | 0x6789 | /attacked.html | 1000000 | 0 |
| . | | | | | | |
| . | | | | | | |
| . | | | | | | |

Table 3 depicts an exemplary stage 2 table for attribution for tracking the application layer attacks on HTTP URLs according to an embodiment of the present invention. In one embodiment, in this table, entries are created only when there are drops found for a URL in the stage 1 table as shown in Table 2. Stage 2 table creates a unique entry for each first hash index in Table 2 under attack. If there are multiple attributes that collide in Table 2, the second hash values of the URLs that are determined to be under attack by stage 1 meter are calculated based on a second hash algorithm. The second hash values are created as a linked list in Table 3. As an example /underattack.html and /victim.html both have the same first hash value in Table 2, in Table 3 they are spread out as two entries—row 3 and row 4. To achieve this, a new hash scheme (hash 2) is used to calculate the second hash of the string. The second hash is written as an attribute in the column (URL Hash2). If a string hash 2 doesn't match with what's already in the corresponding row, a new row is created and linked to the existing row. The link can be the colliding first hash value stored as an index at the second hash table as shown in Table 3. Such extension through linkage is carried out until there are no collisions.

At the end of the blocking period, which according to an embodiment, ager logic 205 goes through stage 2 table 204 to remove the entries from the stage 2 table. A report module 207 may report the rows with details of the complete URL and frees the entries so that they can be used in the next cycle of blocking. This blocking period may be user-defined and according to one embodiment can range from between from 0 to 15 seconds.

Figure 3:
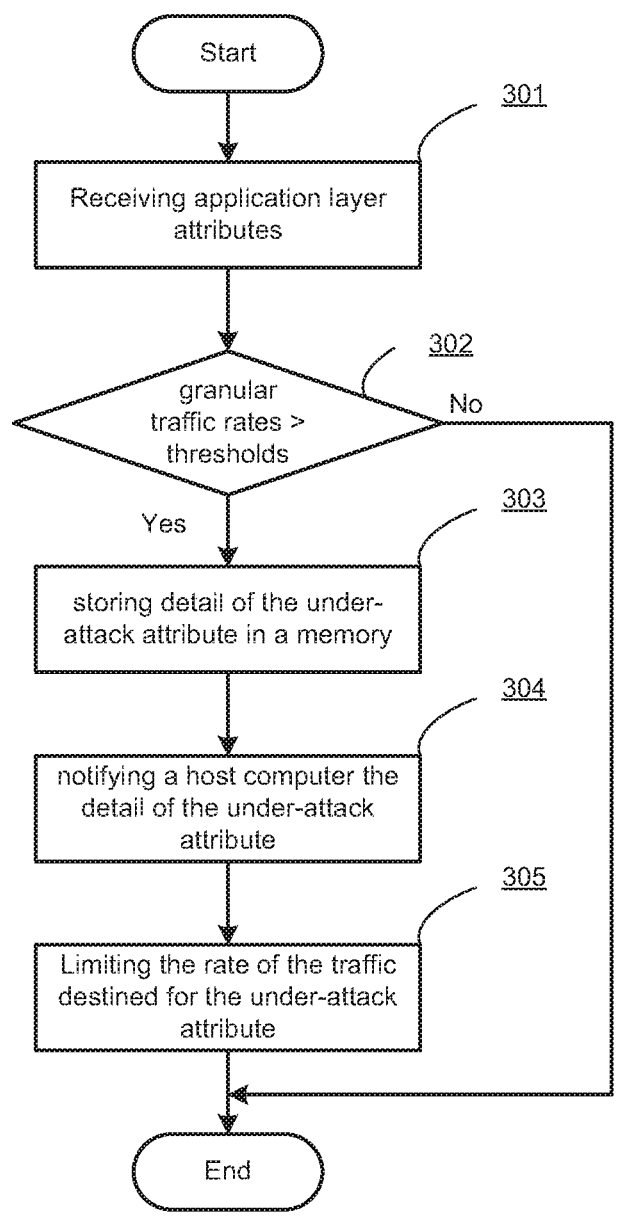
FIG. 3 is a flow diagram illustrating a general process of two stage layer 7 granular rate threshold monitoring in accordance with an embodiment of the present invention.

FIG. 3 is a flow diagram illustrating a general process of two stage layer 7 granular rate threshold monitoring in accordance with an embodiment of the present invention.

At block 301, a DDoS detection module of a network receives information regarding multiple application layer attributes. The information regarding application layer attributes may be collected by a layer 7 classifier from data packets of network traffic going through a network. The information regarding application layer may include the first hash values of application layer attributes, e.g., URLs, that are hosted by one or more host computers. The first hash values of the monitored application layer attributes are calculated based on a first hash algorithm and the length of the first hash values may be limited in order that a stage 1 table containing all monitored hash values may be stored in the memory of DDoS detection module. The DDoS detection module monitors the first hash values to determine if the URLs are under attack.

At block 302, the DDoS detection module determines an attack status for each of the monitored attributes by comparing granular traffic rates directed to the first hash value of each of the monitored attributes to corresponding adaptive thresholds. When a granular traffic rate for the a particular first hash value of a particular monitored attribute of multiple monitored attributes of the granular traffic rates is determined to exceed an adaptive threshold for the particular monitored attribute, then the particular monitored attribute is determined to be an under-attack attribute.

At block 303, when a first hash value is determined to be under attack, the details of the under attack layer 7 attribute is stored within a stage 2 table in the memory. In embodiments of the present invention, detailed information regarding the layer 7 attributes may be stored in memory at stage 2 of the layer 7 DDoS detection only when they are determined to be under attacked at stage 1 of layer 7 DDoS detection. Because the number of layer 7 attributes that are currently under attack is much smaller as compared to the number of all the monitored layer 7 attributes, the depth of stage 2 table is much less than that of stage 1 table and the details of under attack layer 7 attributes, e.g., the full URLs, can be easily stored, accessed and managed within stage 2 table in memory.

When the first hash value is not long enough and hash collisions are likely to occur, a second hash value of the attribute that is determined to be under attack at the first stage may be calculated in order to determine if the attribute is a victim attribute due to the collision of the first hash values. The process of stage 2 DDoS detection is described further below with reference to FIG. 4.

At block 304, the layer 7 DDoS detection module may notify a host computer coupled to the DDoS detection module of the attack status together with the detail of for the under attack attribute stored within stage 2 table in memory.

At block 305, the DDoS detection module may rate limit the traffic destined for the particular identified attribute so that the rest of the traffic which is not destined for this attribute goes unaffected. The details of operation of blocks 304 and 305 are well known in the art, therefore detailed descriptions thereof are omitted for sake of brevity.

Figure 4:
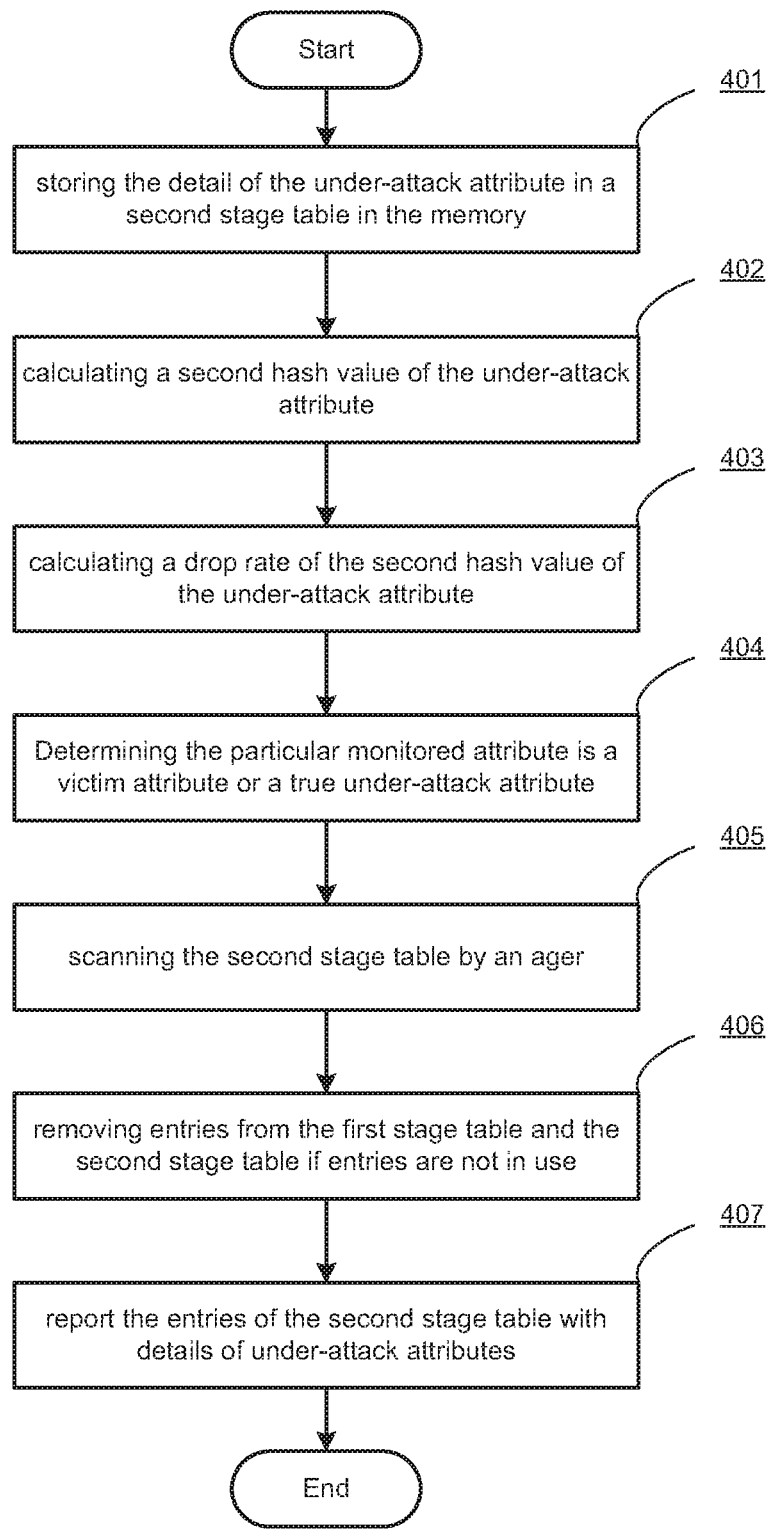
FIG. 4 illustrates a flow diagram illustrating a detailed process of two stage layer 7 granular rate in accordance with an embodiment of the present invention.

FIG. 4 is a flow diagram illustrating a detailed process of stage 2 layer 7 DDoS detection in accordance with an embodiment of the present invention. In the present example, a first hash value is determined to be under attack by a layer 7 DDoS detection module at stage 1 and a stage 2 DDoS detection is used for reporting details of the under attack attributes.

At block 401, a layer 7 DDoS detection module stores detailed information regarding an attribute corresponding to an under attack first hash value within a stage 2 table in a memory of the DDoS detection module at stage 2 of the layer 7 DDoS detection. The detailed information may include a URL that is under attack.

At block 402, the layer 7 DDoS detection module may calculate a second hash value of the attribute corresponding to the under attack first hash value. When the first hash value of two or more attributes collide due the length limit of the first hash value, second hash values of the collided attributes may be calculated based on a second hash algorithm. The second hash values of the collided attributes do not collide because the second hash algorithm is different from the first hash algorithm. The collided attributes in stage 1 DDoS detection may be distinguished by the second hash values at the stage 2 of the layer 7 DDoS detection. The second hash values of collided attributes may be stored in a stage 2 table as a link of the colliding first hash value. For example, a "hash 2" column of Table 3 is used for storing the second hash values of under attack attributes that collide in the stage 1 DDoS detection.

At block 403, the layer 7 DDoS detection module may calculate a drop count of the second hash value to further determine if a layer 7 attribute that is dropped at stage 1 of DDoS detection is a victim attribute due to the hash collision. For example, a "drop count" column of Table 3 is used for recording the granular traffic rate of the second hash value. In Table 2, a first hash value "1022" is dropped 20,000 times at stage 1 of the layer 7 DDoS detection. However, the first hash value "1022" is colliding for two URLs "/under-attack.html" and "/victim.html". Therefore, both of the two colliding URLs are dropped at stage 1. At stage 2, the second hash values of the colliding URLs are distinguished by the second hash values "0x1234" and "0x4321" and the drop rate of the second hash values are calculated separately. In this example, the second hash value "0x1234" is counted 15000 times at stage 2 of the layer 7 DDoS detection and the second hash value "0x4321" is counted 5000 times at stage 2.

At block 404, the layer 7 DDoS detection module may check if the dropped attributes at stage 1 are really under attack or victims due to hash collision by comparing drop count of second hash values with thresholds. If a drop count of a second hash value is higher than a threshold, the attribute corresponding to the second hash value is really under attack because the access rate of the attribute are actually higher than normal usage. If the drop count is lower than the threshold, the attribute corresponding to the second hash value is a victim because the access rate of the attribute is lower than normal usage but it is dropped by the layer 7 DDoS detection module.

At block 405, an ager of the layer 7 DDoS detection module may scan the stage 2 table in the memory and remove the entries which are not in use for a period from the tables at block 406.

At block 407, the ager may report the attack status together with details of attributes stored in stage 2 table. As the entries of stage 2 table are limited, details of under-attack attributes stored in stage 2 table may include all the information that are need for reporting the layer 7 DDoS attacks, such as the URLs in full length. The report may also include status of an attribute, such as under-attack, flooded or victim.

Figure 5:
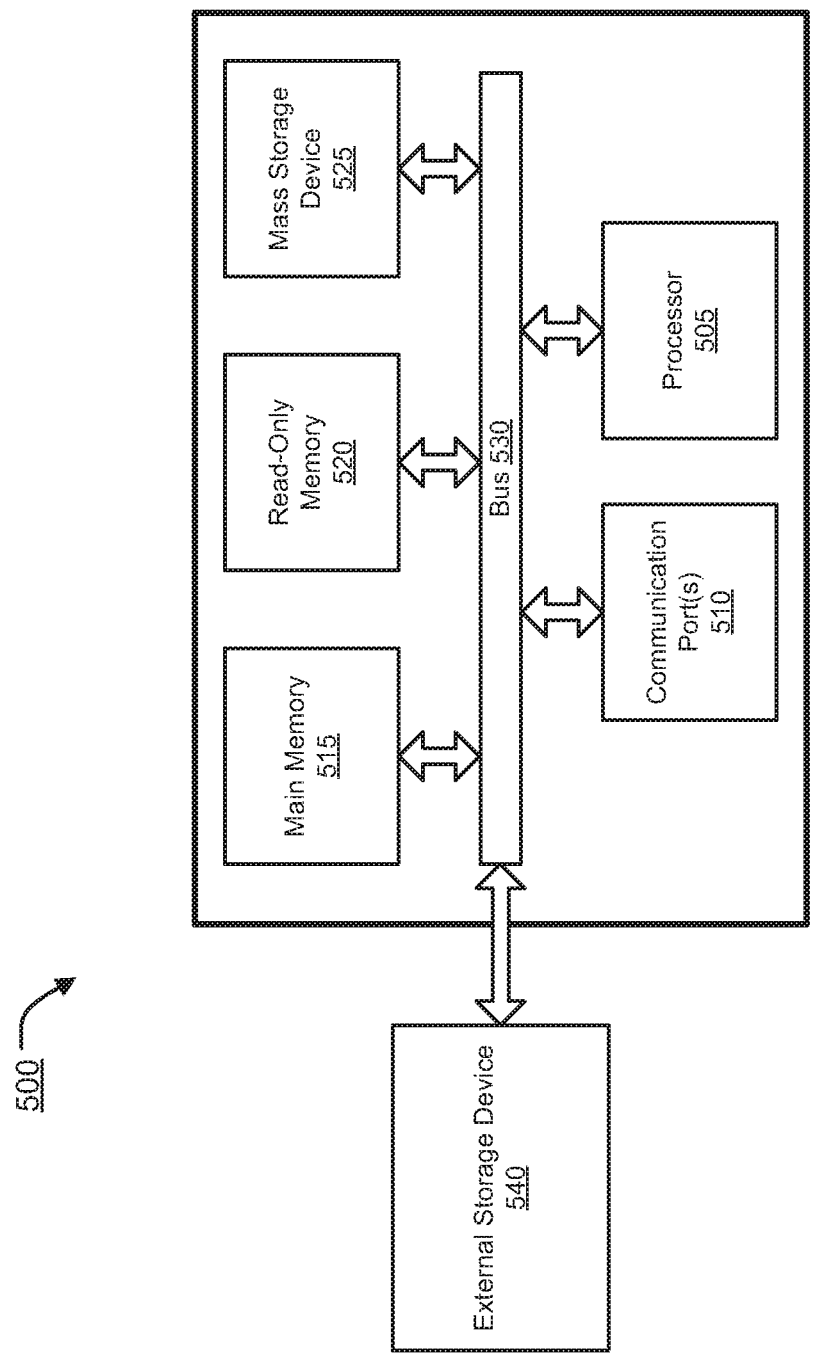
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses described herein, it is within the scope and spirit of the present invention. Once a digital computer system is programmed to perform particular functions pursuant to computer-executable instructions from program software that implements embodiments of the present invention, it in effect becomes a special purpose computer. The techniques necessary to achieve this are well known to those skilled in the art and thus are not further described herein.

Computer executable instructions implementing the methods and techniques described herein can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing embodiments of the present invention.

Accordingly, drawings, tables, and description disclosed herein illustrate technologies related to the invention, show examples of embodiments of the invention, and provide examples of using embodiments of the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. A method comprising:
receiving, by a distributed denial of service (DDoS) detection module of a DDoS mitigation appliance within a network, information regarding a plurality of application layer attributes for which an attack status is to be monitored, wherein the plurality of application layer attributes comprise strings of characters and wherein the strings are variable-length and some of the strings have a potential for exceeding one hundred characters;

determining the attack status for each of the plurality of monitored attributes by comparing, by the DDoS detection module, granular traffic rates directed to a first hash value of each of the plurality of monitored attributes to a plurality of corresponding adaptive thresholds, wherein the first hash value is calculated based on a first hash algorithm;

when a granular traffic rate for the first hash value of a particular monitored attribute of the plurality of monitored attributes exceeds an adaptive threshold for the particular monitored attribute, the particular monitored attribute is determined to be an under-attack attribute;

storing, by the DDoS monitor module, details regarding the under-attack attribute in a memory of the DDoS detection module;

storing, by the DDoS monitor module, the first hash value of each of the plurality of monitored attributes in a first stage table in the memory;

storing, by the DDoS monitor module, the details of the under-attack attribute in a second stage table in the memory after the under-attack attribute is determined;

calculating, by the DDoS monitor module, a second hash value of the under-attack attribute based on a second hash algorithm;

calculating, by the DDoS monitor module, a drop count for the second hash value of the under-attack attribute;

when the drop count for the second hash value of the under-attack attribute does not exceed an adaptive threshold for the under-attack attribute, the under-attack attribute is determined to be a victim attribute;

notifying, by the DDoS detection module, a host computer coupled to the DDoS detection module of the attack status and the details of the under-attack attribute; and responsive to identifying the under-attack attribute, causing, by the DDoS detection module, subsequently received packets having the under-attack attribute to be dropped for a pre-determined blocking period.

2. The method of claim 1, further comprising:
scanning, by an ager logic of the DDoS monitor module, the second stage table; and
removing, by the ager logic, an entry from the second stage table if the entry is not in use within a pre-determined time period.

3. The method of claim 2, further comprising reporting, by the ager logic, the entries of the second stage table with the details of under-attack attributes at an end of the pre-determined blocking period.

4. The method of claim 3, wherein the pre-determined blocking period is from 0 to 15 seconds.

5. The method of claim 1, further comprising:
when a collision between the first hash value occurs between multiple of the plurality of monitored attributes, generating, by the DDoS monitor module, multiple second hash values for the multiple monitored attributes;

storing, by the DDoS monitor module, the multiple second hash values of the multiple monitored attributes within multiple entries of the second stage table; and linking, by the DDoS monitor module, the multiple entries of the second hash values with the collided first hash value in the second stage table.

6. The method of claim 1, wherein the details of the under-attack attribute comprise a full-length string representing the under-attack attribute.

7. The method of claim 1, wherein the first hash value of each of the plurality of monitored attributes is less than 20 bits.

8. The method of claim 1, wherein the first hash algorithm is selected from any one of MD5, Secure Hash Algorithm (SHA), cyclic redundancy check (CRC).

9. The method of claim 1, wherein the application layer attributes are associated with Hypertext Transfer Protocol (HTTP) and wherein the application layer attributes include one or more of a user-agent, a host, a referrer, a cookie and a Uniform Resource Locator (URL).

10. A computer system comprising:
non-transitory storage device having tangibly embodied therein instructions representing a security application; and
one or more processors coupled to the non-transitory storage device and operable to execute the security application to perform a method comprising:
receiving, by a distributed denial of service (DDoS) detection module within a network, information regarding a plurality of application layer attributes for which an attack status is to be monitored, wherein the plurality of application layer attributes comprise strings of characters and wherein the strings are variable-length and some of the strings have a potential for exceeding one hundred characters;
determining the attack status for each of the plurality of monitored attributes by comparing, by the DDoS detection module, granular traffic rates directed to a first hash value of each of the plurality of monitored attributes to a plurality of corresponding adaptive thresholds, wherein the first hash value is calculated based on a first hash algorithm;
when a granular traffic rate for the first hash value of a particular monitored attribute of the plurality of monitored attributes exceeds an adaptive threshold for the particular monitored attribute, the particular monitored attribute is determined to be an under-attack attribute;
storing, by the DDoS monitor module, details regarding the under-attack attribute in a memory of the DDoS detection module;
storing, by the DDoS monitor module, the first hash value of each of the plurality of monitored attributes in a first stage table in the memory;
storing, by the DDoS monitor module, the details of the under-attack attribute in a second stage table in the memory after the under-attack attribute is determined;
calculating, by the DDoS monitor module, a second hash value of the under-attack attribute based on a second hash algorithm;
calculating, by the DDoS monitor module, a drop count for the second hash value of the under-attack attribute;
when the drop count for the second hash value of the under-attack attribute does not exceed an adaptive threshold for the under-attack attribute, the under-attack attribute is determined to be a victim attribute;
notifying, by the DDoS detection module, a host computer coupled to the DDoS detection module of the attack status and the details of the under-attack attribute; and
responsive to identifying the under-attack attribute, causing, by the DDoS detection module, subsequently received packets having the under-attack attribute to be dropped for a pre-determined blocking period.

11. The computer system of claim 10, wherein the method further comprises:
scanning, by an ager logic of the DDoS monitor module, the second stage table; and
removing, by the ager logic, an entry from the second stage table if the entry is not in use within a pre-determined time period.

12. The computer system of claim 11, wherein the method further comprises reporting, by the ager logic, the entries of the second stage table with the details of under-attack attributes at an end of the pre-determined blocking period.

13. The computer system of claim 12, wherein the pre-determined blocking period is from 0 to 15 seconds.

14. The computer system of claim 10, wherein the method further comprises:
when a collision between the first hash value occurs between multiple of the plurality of monitored attributes, generating, by the DDoS monitor module, multiple second hash values for the multiple monitored attributes;
storing, by the DDoS monitor module, the multiple second hash values of the multiple monitored attributes within multiple entries of the second stage table; and
linking, by the DDoS monitor module, the multiple entries of the second hash values with the collided first hash value in the second stage table.

15. The computer system of claim 10, wherein the details of the under-attack attribute comprise a full-length string representing the under-attack attribute.

16. The computer system of claim 10, wherein the first hash value of each of the plurality of monitored attributes is less than 20 bits.

17. The computer system of claim 10, wherein the first hash algorithm is selected from any one of MD5, Secure Hash Algorithm (SHA), cyclic redundancy check (CRC).

18. The computer system of claim 10, wherein the application layer attributes are associated with Hypertext Transfer Protocol (HTTP) and wherein the application layer attributes include one or more of a user-agent, a host, a referrer, a cookie and a Uniform Resource Locator (URL).

* * * * *